(12) United States Patent
Divo et al.

(10) Patent No.: US 9,428,142 B2
(45) Date of Patent: Aug. 30, 2016

(54) GAS GENERATOR

(71) Applicant: Takata AG, Aschaffenburg (DE)

(72) Inventors: Hans-Jurgen Divo, Langenau (DE); Christine-Martina Ganso, Ulm (DE); Gerhard Klingauf, Balzheim (DE); Roland Schnabl, Ulm (DE); Jochen Benz, Ulm (DE)

(73) Assignee: Takata AG, Aschaffenburg (DE)

( * ) Notice: Subject to any disclaimer, the term of this patent is extended or adjusted under 35 U.S.C. 154(b) by 0 days.

(21) Appl. No.: 14/359,359

(22) PCT Filed: Nov. 7, 2012

(86) PCT No.: PCT/DE2012/200073
§ 371 (c)(1),
(2) Date: May 20, 2014

(87) PCT Pub. No.: WO2013/075710
PCT Pub. Date: May 30, 2013

(65) Prior Publication Data
US 2014/0311375 A1 Oct. 23, 2014

(30) Foreign Application Priority Data
Nov. 22, 2011 (DE) .......................... 10 2011 086 838

(51) Int. Cl.
*B60R 21/264* (2006.01)
*B29C 45/14* (2006.01)
(Continued)

(52) U.S. Cl.
CPC ....... *B60R 21/264* (2013.01); *B29C 45/14598* (2013.01); *B60R 2021/2612* (2013.01); *B60R 2021/26029* (2013.01); *B60R 2021/26076* (2013.01); *F42B 3/04* (2013.01)

(58) Field of Classification Search
CPC ... B60R 21/26; B60R 21/261; B60R 21/264; B60R 2021/2612; B60R 2021/26076; B60R 2021/26029; F42B 3/103; F42B 3/04; B29C 45/4598
USPC .......... 102/530, 531; 280/736, 740, 741, 742
See application file for complete search history.

(56) References Cited

U.S. PATENT DOCUMENTS

| 5,131,679 A | 7/1992 | Novak et al. |
| 5,454,593 A * | 10/1995 | Armstrong, III ......... F42B 3/04 102/530 |

(Continued)

FOREIGN PATENT DOCUMENTS

| DE | 1 141 237 B | 12/1962 |
| DE | 41 38 888 A1 | 6/1992 |

(Continued)

OTHER PUBLICATIONS

English Translation of the Written Opinion of the International Searching Authority in PCT/DE2012/200073; mailed on May 2014.*

(Continued)

*Primary Examiner* — James S Bergin
(74) *Attorney, Agent, or Firm* — Gordon & Rees LLP

(57) ABSTRACT

The invention relates inter alia to a gas generator (10) for generating a driving gas for a vehicle safety device, wherein the gas generator has an ignition device (30) and propellant (50) which generates gas after being ignited by the ignition device (30). It is provided according to the invention that the gas generator (10) has a tube (20), to one tube end (21) of which the ignition device (30) is fixed by means of a moulded-in or moulded-on injection-moulded body (40).

2 Claims, 15 Drawing Sheets

Figure 1:
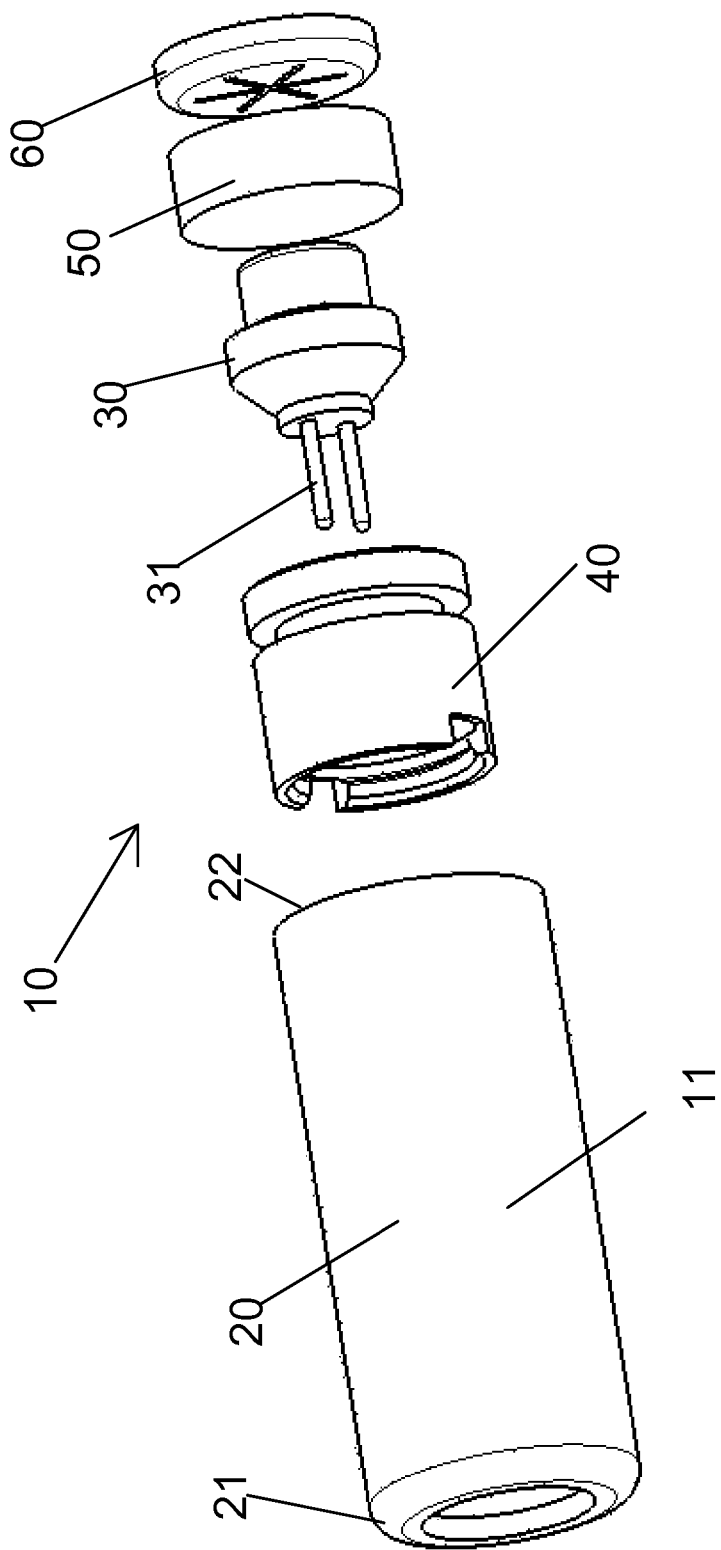

(51) Int. Cl.
*B60R 21/26* (2011.01)
*F42B 3/04* (2006.01)
*B60R 21/261* (2011.01)

(56) References Cited

U.S. PATENT DOCUMENTS

| | | |
|---|---|---|
| 5,956,954 A | 9/1999 | Schmid |
| 6,070,903 A | 6/2000 | Beisswenger et al. |
| 6,314,888 B1 | 11/2001 | Muller et al. |
| 6,718,884 B1 * | 4/2004 | Yabuta .................. F42B 3/103 102/202.14 |
| 7,229,100 B2 | 6/2007 | Cunningham et al. |
| 7,568,728 B2 * | 8/2009 | Smith et al. .................. 280/736 |
| 7,918,006 B2 | 4/2011 | Brayman et al. |
| 8,662,532 B2 * | 3/2014 | Parks .................. B60R 21/26 102/530 |
| 2002/0007547 A1 | 1/2002 | Unewisse et al. |
| 2002/0008373 A1 | 1/2002 | Specht |
| 2002/0145275 A1 | 10/2002 | Hosey et al. |
| 2003/0155757 A1 | 8/2003 | Larsen |
| 2005/0017496 A1 | 1/2005 | Stevens et al. |
| 2005/0104348 A1 | 5/2005 | McCormick |
| 2005/0151364 A1 | 7/2005 | Kameda et al. |
| 2007/0046026 A1 | 3/2007 | Wells et al. |
| 2007/0273131 A1 | 11/2007 | Smith et al. |
| 2008/0231042 A1 | 9/2008 | Brayman et al. |
| 2010/0096844 A1 | 4/2010 | Staheli et al. |

FOREIGN PATENT DOCUMENTS

| | | |
|---|---|---|
| DE | 41 41 908 A1 | 7/1992 |
| DE | 41 41 908 C2 | 7/1992 |
| DE | 198 13 708 A1 | 9/1999 |
| DE | 202 16 611 U1 | 1/2003 |
| DE | 20 2005 015 794 U1 | 2/2006 |
| DE | 20 2006 004 008 U1 | 8/2006 |
| DE | 10 2008 008 041 A1 | 7/2008 |
| DE | 10 2008 049 650 A1 | 4/2010 |
| DE | 10 2008 049 652 A2 | 4/2010 |
| DE | 10 2009 021 527 A1 | 11/2010 |
| DE | 10 2009 023 593 A1 | 12/2010 |
| EP | 5 050 24 B1 | 6/1996 |
| EP | 1 217 325 A1 | 6/2002 |
| EP | 0 943 503 B1 | 5/2005 |
| EP | 1 580 324 A1 | 9/2005 |
| WO | WO 2007/003395 A1 | 1/2007 |
| WO | WO2009/043904 A2 | 4/2009 |

OTHER PUBLICATIONS

International Search Report for PCT/DE2012/200073; mailed May 27, 2013; 7 pages.

* cited by examiner

GAS GENERATOR

The invention relates to a gas generator having the features according to the preamble of patent claim 1.

A vehicle safety device having a gas generator for generating a driving gas is known from German Offenlegungsschrift DE 10 2008 008 041 A1, for example. The gas generator has an ignition device and propellant, which generates the driving gas after being ignited by the ignition device.

It is the underlying object of the invention to specify a gas generator which can be produced in a simple and low-cost manner and is mechanically stable.

According to the invention, this object is achieved by a gas generator having the features according to patent claim 1. Advantageous embodiments of the gas generator according to the invention are indicated in the dependent claims.

According to the above, it is envisaged according to the invention that the gas generator has a tube, on one tube end of which the ignition device is fixed by means of a molded-in or molded-on injection molded body.

One significant advantage of the gas generator according to the invention is to be seen in the fact that the attachment of the ignition device to the generator housing is achieved in a very simple manner, namely by molding on, and no mechanical bending steps, e.g. crimping steps or the like, are necessary.

Another significant advantage of the gas generator according to the invention is to be seen in the fact that the attachment of the ignition device to the generator housing is possible in a very space-saving way since—as already explained—no further mechanical connecting components for crimping or the like are necessary.

Another significant advantage of the gas generator according to the invention consists in that the fastening is very insensitive to tolerances since fluctuations in the size of the tube of the gas generator or of the ignition device are compensated for automatically: if the tube is larger or the ignition device smaller than usual, the injection molded body formed during molding will be larger than usual; the same applies in the opposite case when the tube is smaller or the ignition device is larger than usual: in this case, the injection molded body formed during molding will be smaller than usual.

The gas generator is preferably a micro gas generator, particularly preferably an integrated micro gas generator.

With a view to a firm connection for the ignition device, it is regarded as advantageous if the ignition device is cast in, molded in and/or overmolded in the tube at the tube end thereof. An inner section of the injection molded body is preferably situated in the tube and rests (radially) against the inside of the tube. In this case, the ignition device is preferably partially embedded in the inner section of the injection molded body.

The cross section of the tube of the gas generator is preferably round but it can also have some other shape, e.g. oval or angular, e.g. square, rectangular etc.

An outer section of the injection molded body which is situated outside the tube preferably forms a sleeve which laterally surrounds the electric connection elements of the ignition device, which are passed out of the tube.

The sleeve is preferably shaped in such a way that it can accommodate a mechanical interface element for the electrical contacting of the electric connection elements of the ignition device.

In order to allow a positive connection between the injection molded body and the tube, it is regarded as advantageous if, arranged between the inner section of the injection molded body and the outer section of the injection molded body, there is a central section, the diameter of which is smaller than that of the inner and the outer section. The opening diameter of the tube at the tube end is preferably reduced. The diameter of the central section preferably corresponds to the reduced opening diameter of the tube at the tube end.

The combustion chamber of the gas generator is preferably closed by a cap at the end thereof remote from the ignition device.

The cap preferably has at least one tear-open section, in particular at least one tear-open seam, which is torn open after ignition of the propellant and allows the gas formed by the propellant to escape from the combustion chamber. In addition or as an alternative, the cap can have at least one preproduced cap opening, which allows the gas formed to escape from the combustion chamber after ignition of the propellant.

The propellant is preferably mounted on or against a cap and/or is accommodated in a separate propellant container, which is introduced into the combustion chamber.

A propellant container of this kind preferably has a film or is preferably formed by a film, into which the propellant is welded. The propellant container can be formed by a bag which consists entirely or partially of film, for example.

The propellant container having the film is preferably evacuated (with respect to the gas contained therein beforehand, i.e. on the gas side). In such an embodiment, the film can come to rest on the propellant pellets containing the propellant and can thus fix the position of propellant pellets relative to one another in the propellant container.

A preignition charge, the ignition temperature of which is lower than that of the propellant, is preferably accommodated in the propellant container. The position of the preignition charge in the propellant container is preferably chosen in such a way that the preignition charge lies in the region of the end of the combustion chamber remote from the ignition device. The preignition charge preferably adjoins the cap delimiting the combustion chamber; this is intended to mean that there is preferably no propellant between the cap and the preignition charge.

The cap preferably has good heat conduction; the cap can consist of metal, for example.

The cap of the gas generator, which closes the combustion chamber, preferably forms a wall of the propellant container.

As a particularly preferred option, the propellant container is formed by the cap and a film. The propellant and the preignition charge are preferably welded into the film. The internal space delimited by the cap and the film is preferably evacuated, ensuring that the film rests firmly on the propellant and fixes the position of the propellant and/or that of the preignition charge. The fixing is preferably such that the ignition charge rests against the cap. The film is preferably also passed around the outside of the cap in order to enclose the latter.

The invention furthermore relates to a vehicle safety device having a gas generator. According to the invention, it is envisaged that the gas generator has a tube.

An ignition device is preferably fixed by means of a molded-in or molded-on injection molded body on one tube end of the tube.

In addition or as an alternative, a supply tube is mounted on the other tube end of the tube of the gas generator.

In respect of the advantages of the vehicle safety device according to the invention, attention is drawn to the above statements relating to the gas generator according to the invention since the advantages of the vehicle safety device according to the invention correspond substantially to those of the gas generator according to the invention.

The vehicle safety device is preferably a tightener drive for a belt retractor of a safety belt, wherein the tightener drive comprises: the gas generator mentioned, a driving device (e.g. in the form of a driving wheel) and the supply tube mentioned, which connects the gas generator and the driving device, wherein there are one or more thrust elements in the supply tube and, after triggering of the gas generator, these are accelerated and drive the driving device directly or indirectly in order to wind up the safety belt.

As an alternative, the vehicle safety device can be a tightener drive for a buckle pretensioner or an airbag device.

The tube of the gas generator and the supply tube are preferably pushed partially one inside the other and preferably connected to one another by means of a press fit.

According to a particularly preferred embodiment, it is envisaged that the wall material of one of the two tubes, namely of the outer tube, is pressed into at least one prestamped encircling groove (e.g. a 360 degree groove) of the inner tube to form an undercut.

The wall material of the outer tube is preferably stamped into the prestamped encircling groove of the inner tube in at least three, preferably six, mutually separate circular arc segments. The circular arc segments are preferably arranged in a rotationally symmetrical manner on the circumference of the outer tube.

The outer tube is preferably the tube of the gas generator and the inner tube is preferably the supply tube.

According to another preferred embodiment, it is envisaged that wall material of the outer tube is pressed into the entire 360 degree groove of the inner tube. During this process, a 360 degree groove is preferably also formed in the outer tube. The wall material is preferably pressed in by rolling.

In order to achieve a particularly high stability in the region of the joint, it is regarded as advantageous if the inner tube has a greater wall thickness at its end section connected to the outer tube than in its adjoining central tube section. In its end section connected to the outer tube, the inner tube is preferably upset in order to achieve the increase in thickness described. The increase in thickness is preferably between 10% and 30% of the normal wall thickness of the inner tube.

In order to increase stability, provision can furthermore be made for the inner tube to be widened in the region of the tube end thereof and to have a larger diameter at the tube end thereof than in the central tube region thereof between the two tube ends. In the region of overlap between the tube end of the inner tube and the tube end of the outer tube, the diameter of the outer tube is preferably adapted to the diameter of the inner tube, e.g. by pressing the outer tube onto the inner tube, preferably by rolling.

The wall material of the outer tube is preferably pressed into at least two parallel grooves of the inner tube, each of said grooves running around 360 degrees.

According to another preferred embodiment, it is envisaged that the outer tube is shrunk onto the inner tube. Such shrink fitting can be accomplished by heating the outer tube and pushing it onto the inner tube in the heated state and then cooling it. A secure connection to the inner tube is achieved through the contraction of the outer tube.

It is also regarded as advantageous if, in addition or as an alternative, the outer and the inner tube are connected by a bayonet joint.

It is also regarded as advantageous if, in addition or as an alternative, the outer and the inner tube are connected by at least one stud, which is passed through two opposite holes in the wall of the outer tube and two holes aligned therewith in the wall of the inner tube.

The stud is preferably riveted or wobble-riveted to the wall of the outer tube at the stud ends thereof.

As a particularly preferred option, the outer and the inner tube are connected by two studs, the longitudinal axes of which are preferably aligned perpendicularly to one another.

The invention furthermore relates to a method for producing a vehicle safety device. According to the invention, provision is made in this regard for a supply tube to be mounted on one of the two tube ends of a tube of the gas generator. As an alternative or in addition, injection molded material can be molded in or molded on one tube end of the tube of the gas generator to form an injection molded body, and for an ignition device of the gas generator to be fixed by the injection molded body formed.

As regards the advantages of the method according to the invention, attention is drawn to the above statements relating to the gas generator according to the invention since the advantages of the method according to the invention correspond substantially to those of the gas generator according to the invention.

With a view to a firm connection of the ignition device, it is regarded as advantageous if a section of the ignition device is held in the interior of the tube by the injection molded material. The injection molded body is preferably molded on in such a way that an inner section of the injection molded body is situated in the tube and rests against the inside of the tube. An outer section of the injection molded body, which is situated outside the tube, is preferably used to form a sleeve which laterally surrounds the electric connection elements of the ignition device, which are passed out of the tube.

In order to allow a positive connection between the injection molded body and the tube, it is regarded as advantageous if the injection molded body is molded on in such a way that, arranged between the inner section of the injection molded body and the outer section of the injection molded body, there is a central section, the diameter of which is smaller than that of the inner and the outer section. For this purpose, the opening diameter of the tube at the tube end is preferably reduced beforehand. On completion of the injection molding process, the diameter of the central section preferably corresponds to the reduced opening diameter of the tube at the tube end.

The combustion chamber of the gas generator is preferably closed by a cap at the end thereof remote from the ignition device.

The cap is preferably provided with at least one tear-open section, in particular at least one tear-open seam, which is torn open after ignition of the propellant and allows the gas formed by the propellant to escape from the combustion chamber. In addition or as an alternative, the cap can be provided with at least one cap opening, which allows the gas formed to escape from the combustion chamber after ignition of the propellant.

The propellant is preferably accommodated in a separate propellant container, which is introduced into the combustion chamber.

A propellant container of this kind is preferably formed completely or partially by means of a film, into which the propellant is welded. The propellant container can be formed by a bag which is produced entirely or partially with the film, for example.

The propellant container having the film is preferably evacuated, during which process the film can preferably come to rest on the propellant pellets containing the propellant and can thus fix the position of the propellant pellets relative to one another in the propellant container.

A preignition charge, the ignition temperature of which is lower than that of the propellant, is preferably furthermore accommodated in the propellant container. The position of the preignition charge in the propellant container is preferably chosen in such a way that the preignition charge lies in the region of the end of the combustion chamber remote from the ignition device. The preignition charge is preferably positioned against the tube inner wall of the tube and/or adjacent to the cap delimiting the combustion chamber, with the result that there is preferably no other propellant between the cap and the preignition charge.

The cap of the gas generator, which closes the combustion chamber, is preferably used to form a wall of the propellant container.

As a particularly preferred option, the propellant container is formed by the cap and the film. The propellant, the preignition charge and the cap are preferably welded jointly into the film, and the internal space delimited by the cap and the film is preferably evacuated, ensuring that the film rests firmly on the propellant and fixes the position of the propellant. The fixing is preferably performed in such a way that the ignition charge rests against the cap.

The tube of the gas generator and the supply tube are preferably pushed partially one inside the other and preferably connected to one another by means of a press fit.

The wall material of one of the two tubes, namely of the outer tube, is preferably pressed into at least one prestamped encircling groove (e.g. a 360 degree groove) of the inner tube to form an undercut.

The wall material of the outer tube is preferably stamped into the prestamped encircling groove of the inner tube in at least three, preferably six, mutually separate circular arc segments. The circular arc segments are preferably arranged in a rotationally symmetrical manner on the circumference of the outer tube.

According to another preferred embodiment, it is envisaged that wall material of the outer tube is pressed into the entire 360 degree groove of the inner tube. During this process, a 360 degree groove is preferably also formed in the outer tube. The wall material is preferably pressed in by rolling.

The inner tube is preferably provided with a greater wall thickness at its end section connected to the outer tube than in its adjoining central tube section. In its end section connected to the outer tube, the inner tube is preferably upset in order to achieve the increase in thickness described. The increase in thickness is preferably between 10% and 30% of the normal wall thickness of the inner tube.

In order to increase stability, the inner tube can furthermore be widened at the tube end thereof. In the region of overlap between the two tube ends, the diameter of the outer tube is preferably adapted to the diameter of the inner tube, by pressing the outer tube on, preferably by rolling.

It is also possible for the outer tube to be shrunk onto the inner tube. In addition or as an alternative, the outer and the inner tube can be connected by a bayonet joint.

The wall material of the outer tube is preferably pressed into at least two parallel grooves of the inner tube, each of said grooves running around 360 degrees.

In addition or as an alternative, the outer and the inner tube can be connected by at least one stud, which is passed through two opposite holes in the wall of the outer tube and two holes aligned therewith in the wall of the inner tube. The studs can be riveted to the wall of the outer tube at the stud ends thereof.

The invention furthermore relates to a propellant container for a gas generator of a vehicle safety device. According to the invention, the propellant container has a film or is formed by a film, into which the propellant is welded. The propellant container having the film is preferably evacuated (with respect to the gas contained therein beforehand, i.e. on the gas side).

Figure 2:
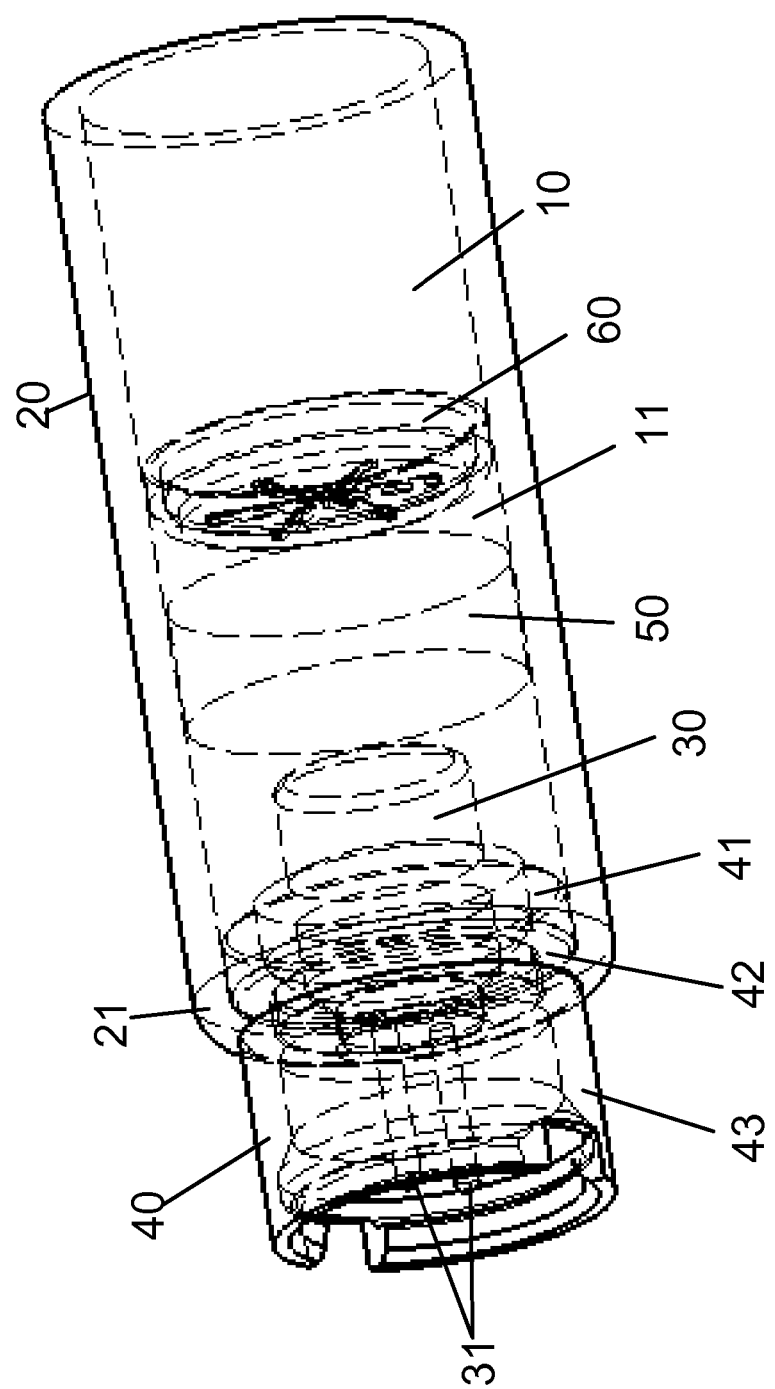
Figure 3:
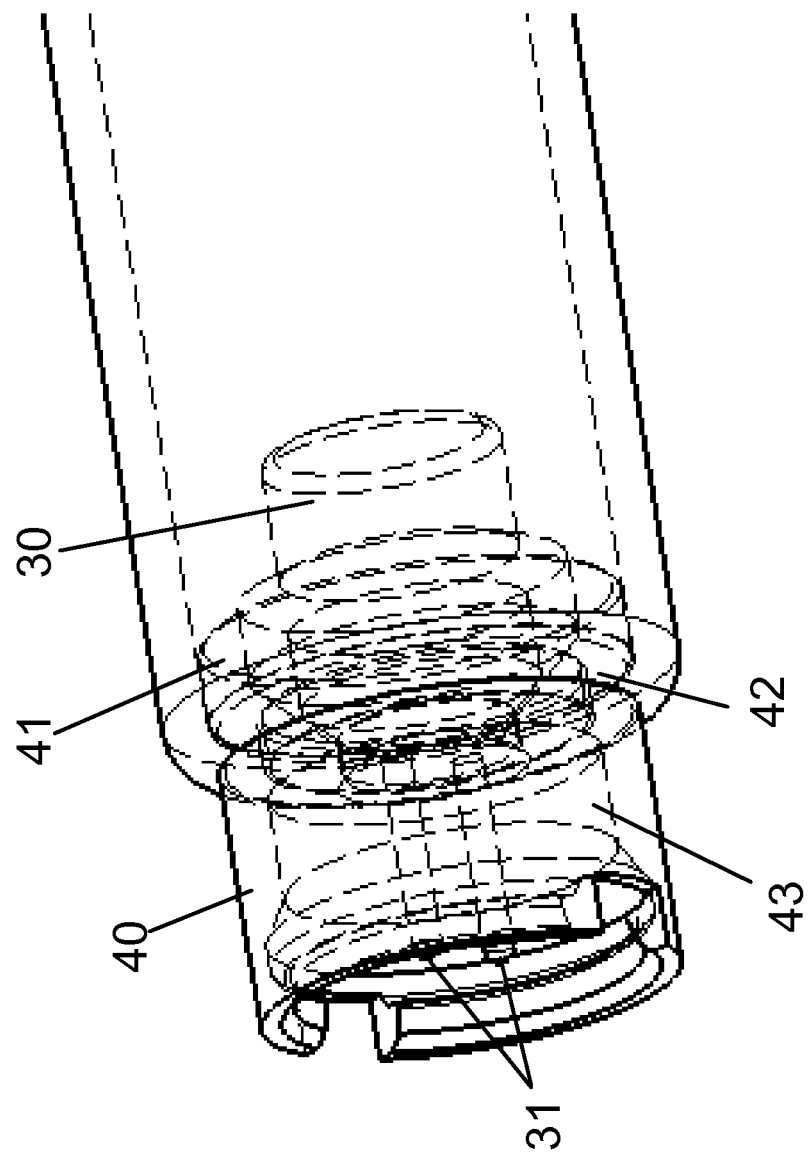
Figure 4:
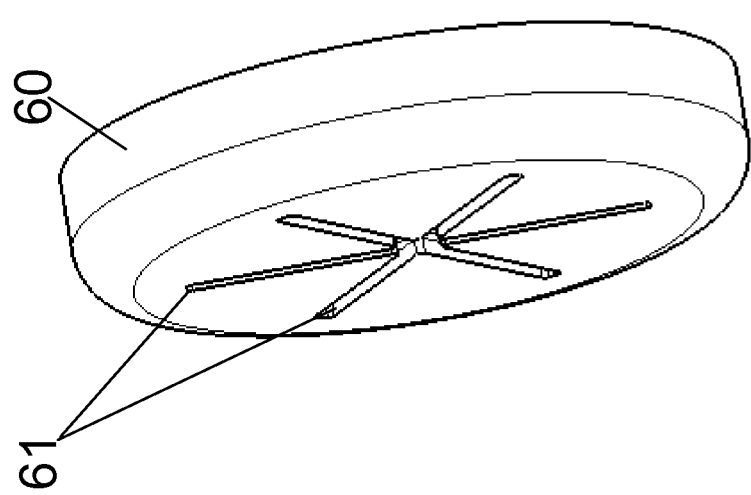
Figure 5:
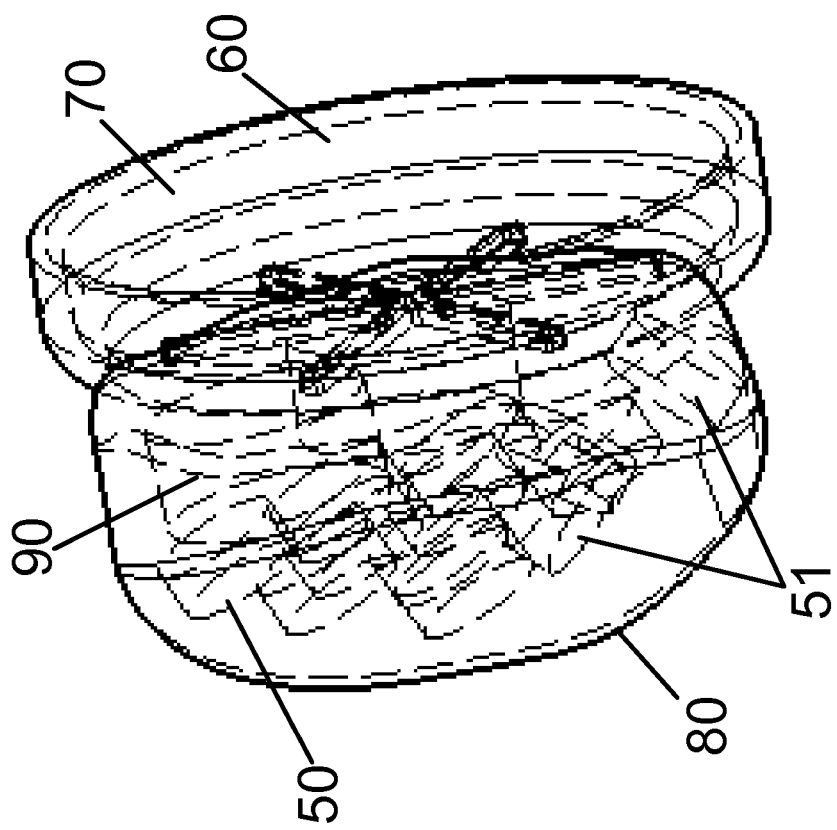
Figure 6:
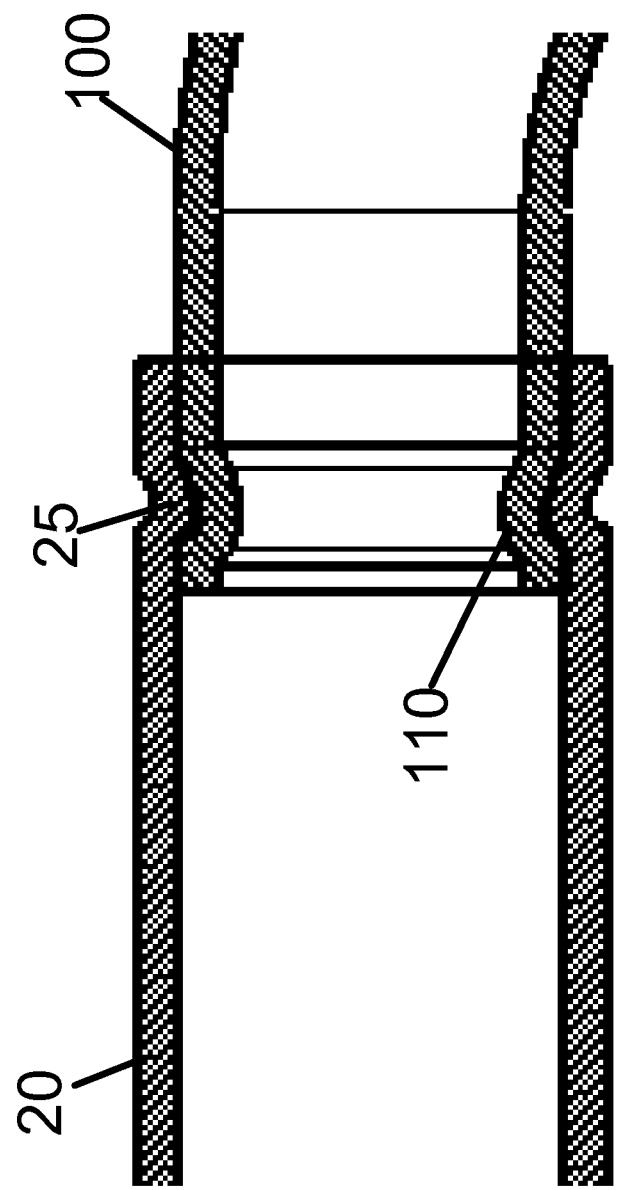
Figure 7:
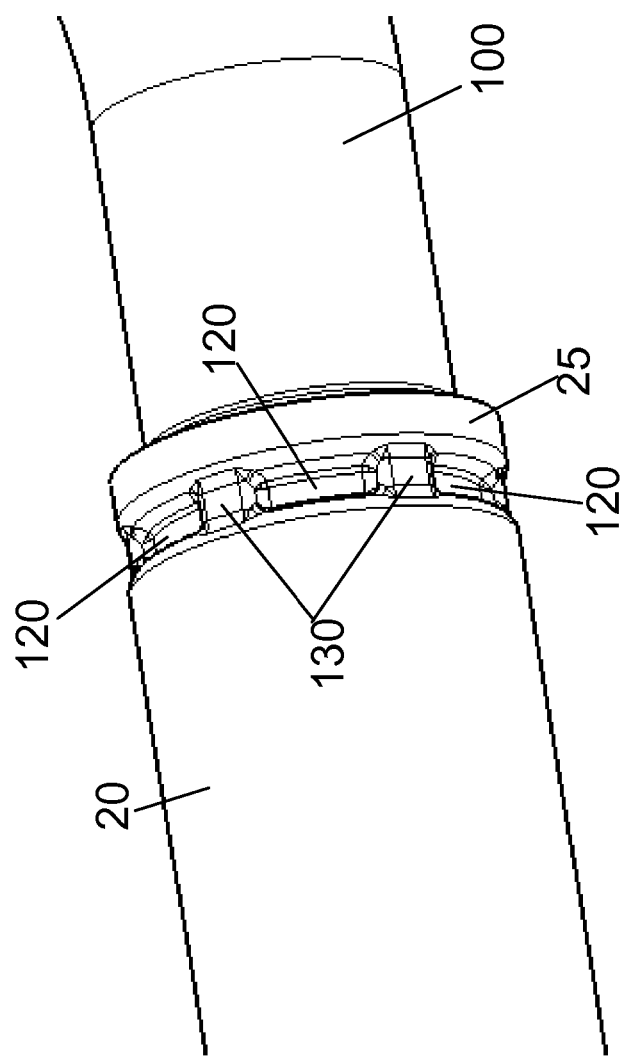
Figure 8:
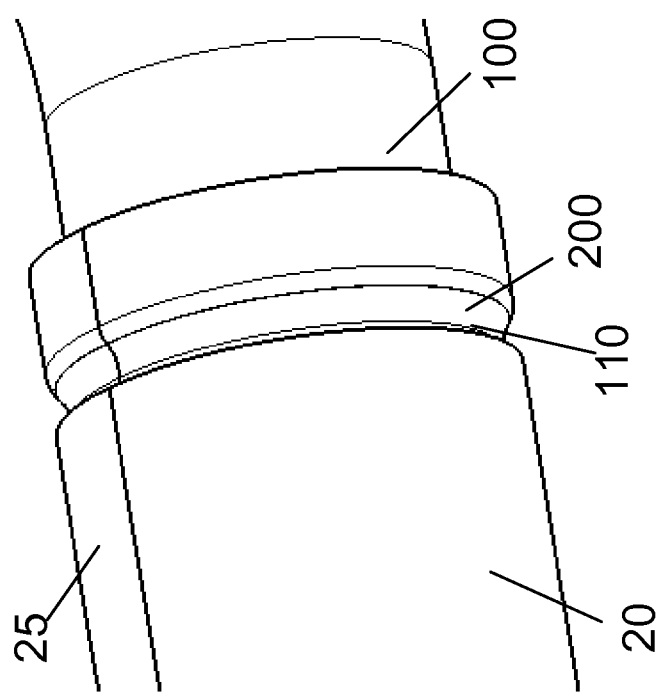
Figure 9:
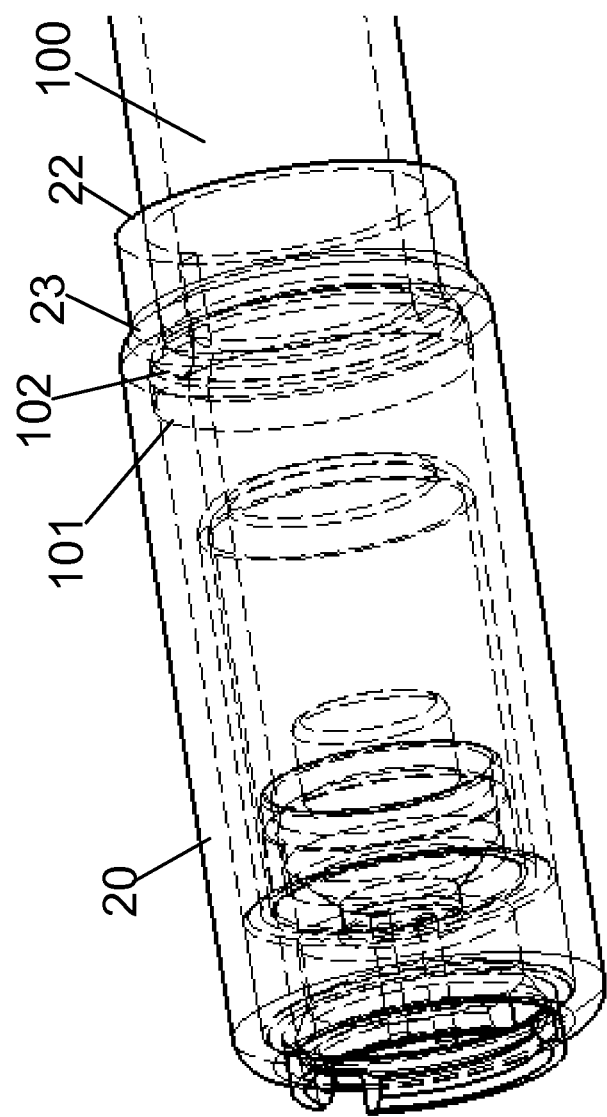
Figure 10:
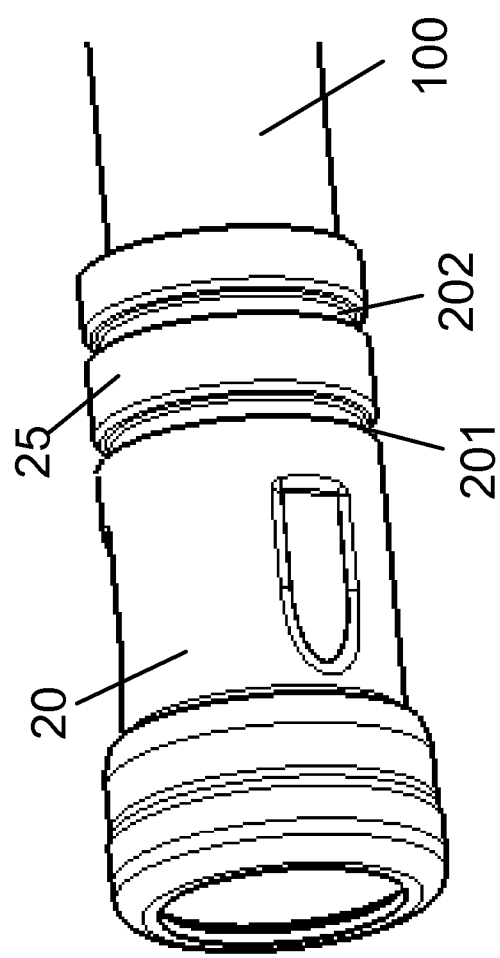
Figure 11:
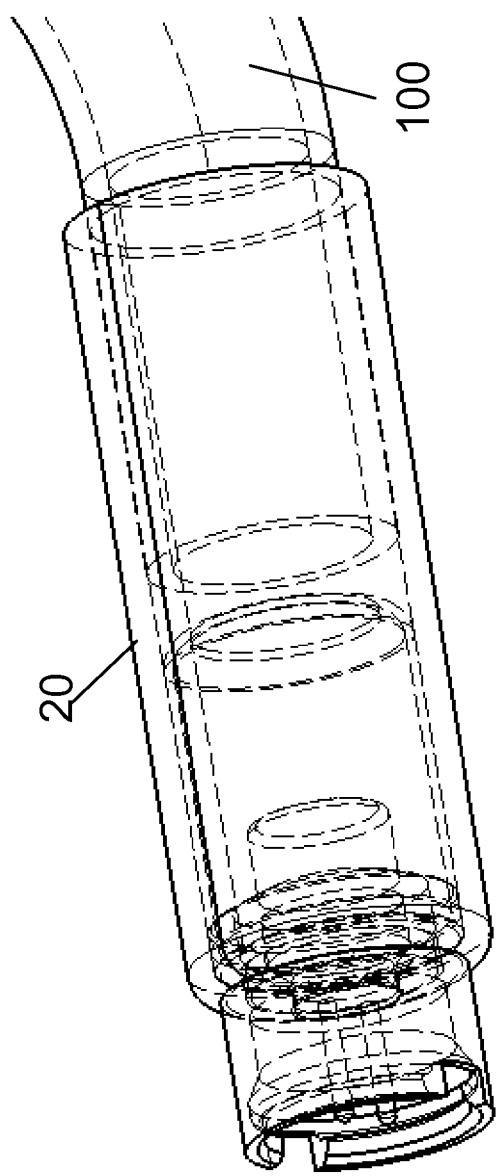
Figure 12:
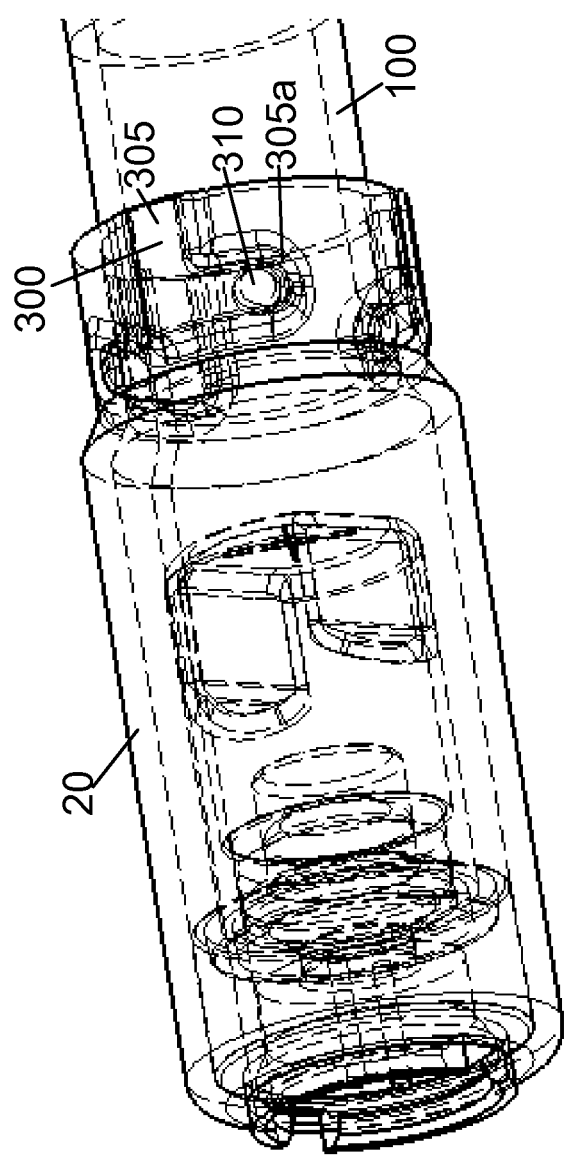
Figure 13:
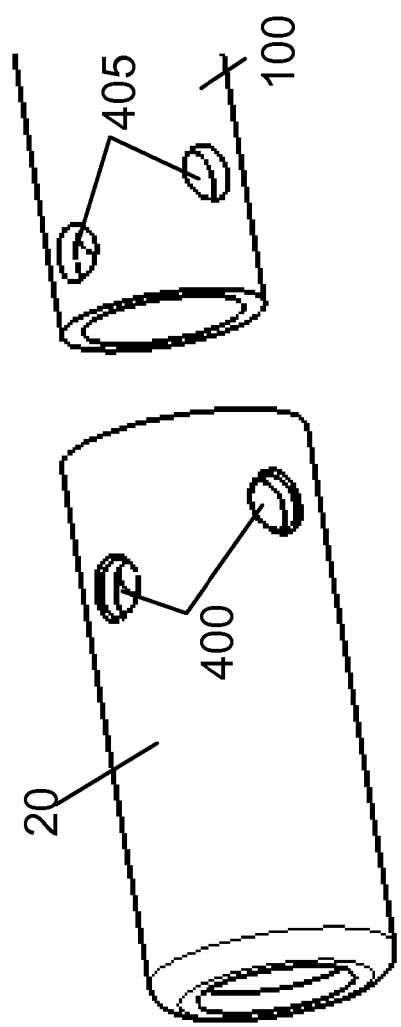
Figure 14:
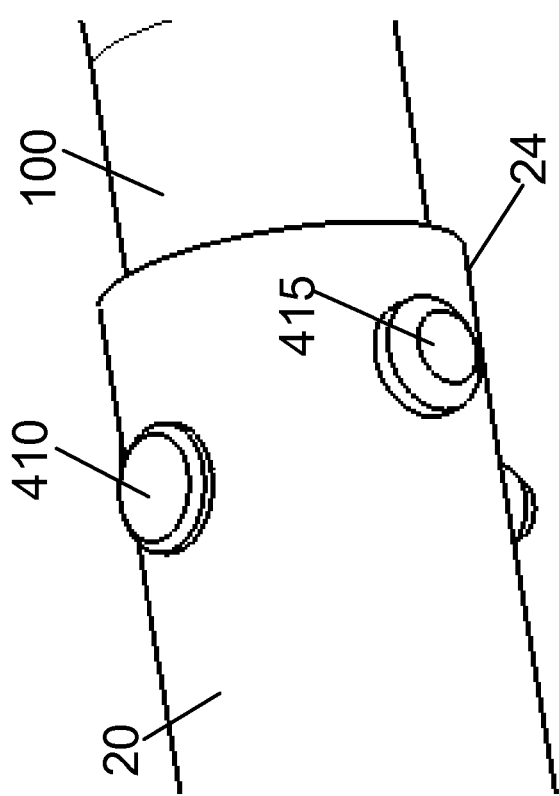
Figure 15:
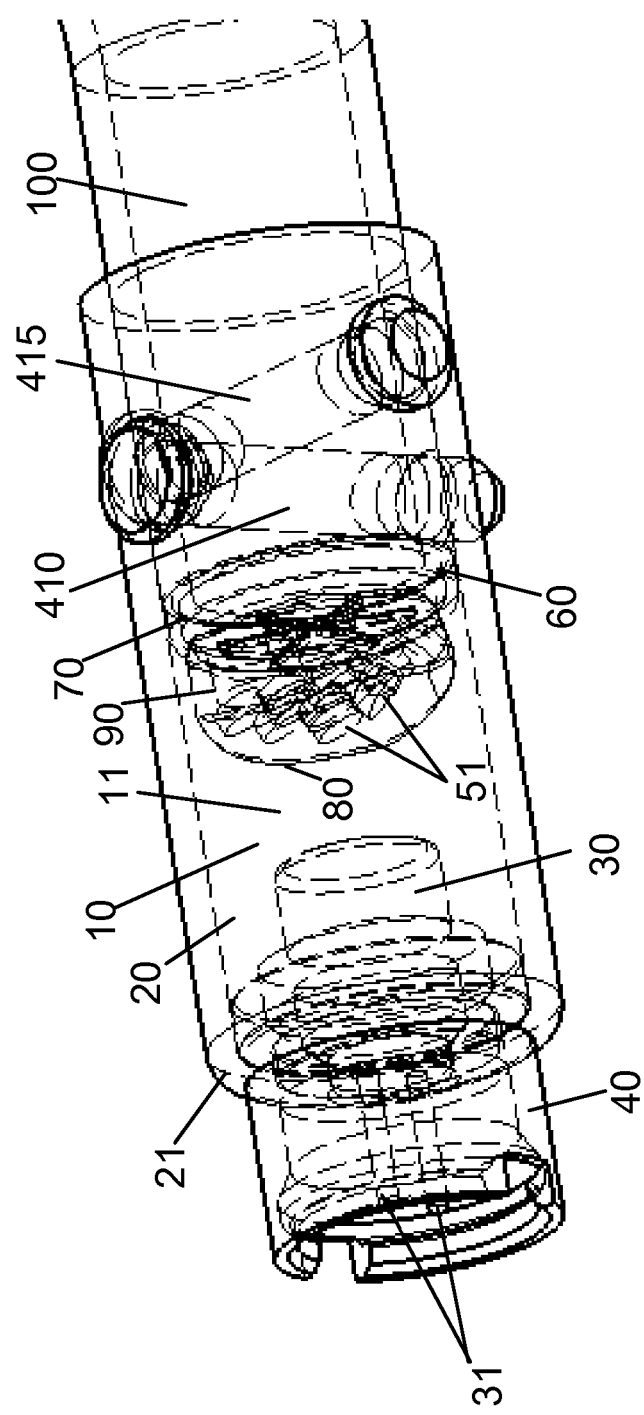

The invention is explained in greater detail below by means of illustrative embodiments; here, by way of example:

FIG. 1 shows a first illustrative embodiment of a gas generator according to the invention in an exploded view, wherein the gas generator has an ignition device which is held by an injection molded body on one tube end of a tube of the gas generator, FIG. 2 shows the gas generator according to FIG. 1 in the assembled state, FIG. 3 shows the embodiment of the injection molded body in the gas generator shown in FIG. 1 in greater detail, FIG. 4 shows an illustrative embodiment of a cap, by means of which the combustion chamber of the gas generator shown in FIG. 1 can be closed, FIG. 5 shows an illustrative embodiment of a propellant container which can be used in the gas generator shown in FIG. 1, FIG. 6 shows an illustrative embodiment of a connection of a supply tube to a tube of a gas generator in cross section, wherein the supply tube is provided with an encircling groove, FIG. 7 shows the connection between the supply tube and the tube of the gas generator shown in FIG. 6 in a view from the outside, FIG. 8 shows another illustrative embodiment of a connection between a supply tube and a tube of a gas generator, wherein both the supply tube and a tube of the gas generator are provided with an encircling groove, FIG. 9 shows another illustrative embodiment of a connection between a supply tube and a tube of a gas generator, wherein the supply tube is widened at the end, FIG. 10 shows another illustrative embodiment of a connection between a supply tube and a tube of a gas generator, wherein both the supply tube and the tube of the gas generator are each provided with two encircling grooves, FIG. 11 shows another illustrative embodiment of a connection between a supply tube and a tube of a gas generator, wherein the tube of the gas generator is shrunk onto the supply tube, FIG. 12 shows another illustrative embodiment of a connection between a supply tube and a tube of a gas generator, wherein the two tubes are connected to one another by means of a bayonet joint, and FIGS. 13-15 show another illustrative embodiment of a connection between a supply tube and a tube of a gas generator, wherein the connection is produced by means of two studs perpendicular to one another.

In the figures, the same reference signs are used in all cases for identical or comparable components for the sake of clarity.

FIG. 1 shows an illustrative embodiment of a gas generator 10 in an exploded view. A tube 20 of the gas generator 10, which is also referred to below as generator tube 20, can be seen.

A first tube end 21 of the generator tube 20 is tapered and has a smaller diameter than the remaining region of the generator tube 20. Thus, it can be seen that the diameter of a second tube end 22 of the generator tube 20 is larger than the diameter of the generator tube 20 at the first tube end 21 thereof.

FIG. 1 furthermore shows an ignition device 30, which is inserted into the generator tube 20 in the region of the first tube end 21 and is fixed in there. To fix the ignition device 30 on the first tube end 21, an injection molded body 40 is provided, which holds the ignition device 30 at least approximately centrally within the first tube end 21 in the generator tube 20.

The injection molded body 40 is produced after the ignition device 30 has been positioned within the generator tube 20. By injecting an injection molding material into the region of the first tube end 21, fixing of the ignition device 30 within the generator tube 20 is then achieved through the formation of the injection molded body 40.

FIG. 1 furthermore shows electric connection elements 31 of the ignition device 30, by means of which the ignition device 30 can be supplied with an electric voltage or an electric current for the purpose of ignition. As will be shown in greater detail below, the connection elements 31 are surrounded by the injection molded body 40 in the form of a sleeve.

FIG. 1 furthermore shows propellant 50, which is introduced into the combustion chamber 11 of the gas generator 10. In this case, the propellant 50 is situated spatially between the ignition device 30 and a cap 60, which closes off the combustion chamber 11 in the direction of the second tube end 22.

FIG. 2 shows the gas generator 10 shown in FIG. 1 in the assembled state. The injection molded body 40, which comprises an inner section 41, a central section and an outer section 43, can be seen. The inner section 41 of the injection molded body 40 is situated within the generator tube 20 and fixes the ignition device 30 within the generator tube 20. For this purpose, the inner section 41 rests against the inner wall of the generator tube 20 and against the outer wall of the ignition device 30, and thus fills the annular gap between the inner wall of the generator tube 20 and the outer wall of the ignition device 30 and forms a kind of retention ring, in the interior region of which the ignition device 30 is situated.

The central section 42 of the injection molded body 40 is passed through the tapered first tube end 21 and thus fixes the position of the injection molded body 40 relative to the generator tube 20.

The outer section 43 of the injection molded body 40 is shaped in the manner of a sleeve and forms a protective sleeve for the two electric connection elements 31 of the ignition device 30. The design of the outer section 43 is chosen in such a way that a mechanical interface element for the electrical contacting of the electric connection elements 31 can be accommodated. Mechanical interface elements of this kind can be mechanically coded in order to avoid incorrect cabling or incorrect electrical connection of the ignition device 30 to the onboard electrical system of a vehicle.

FIG. 2 furthermore shows the positioning of the propellant 50 between the ignition device 30 and the cap 60. The combustion chamber 11 of the gas generator 10 is thus delimited spatially by the first tube end 21 and the cap 60.

FIG. 3 shows the gas generator 10 shown in FIG. 1 in greater detail. The two connection elements 31, which are positioned within the outer section 43 of the injection molded body 40, said outer section being designed as a sleeve, can be seen. Moreover, the two other sections 41 and 42 of the injection molded body 40 are easily recognizable.

FIG. 4 shows an illustrative embodiment of a cap 60 which can be used in the gas generator shown in figure to close the combustion chamber. The cap 60 is equipped with tear-open seams 61, which extended radially outward in a star shape. In the case of an excess pressure in the combustion chamber 11 shown in FIG. 2, the gas released by the propellant will tear open the tear-open seams 61 and allow the gas to escape through the cap 60.

In the illustrative embodiment shown in FIGS. 1 to 4, the propellant 50 and the cap 60 are unconnected. However, it is regarded as particularly advantageous if the cap 60 forms part of a propellant container 70, and one such illustrative embodiment is shown by FIG. 5.

FIG. 5 shows a propellant container 70, which has a film 80 in addition to the cap 60. The film 80 preferably forms a kind of bag, which encloses or surrounds the propellant and the cap 60. The film 18 can be a plastic film, for example.

The propellant 50 is preferably accommodated in the form of propellant pellets 51 together with a preignition charge 90 in the interior of the propellant container 70. The positioning of the preignition charge 90 is preferably chosen in such a way that it rests externally on (e.g. directly on the inner wall of the tube) and/or directly adjoins the cap 60, ensuring that there can be no propellant pellets 51 between the preignition charge 90 and the cap 60 and/or the inner wall of the tube.

In order to ensure reliable positioning of the preignition charge 90 and of the propellant pellets 51 within the propellant container 70, it is regarded as advantageous if the interior of the propellant container 70 is evacuated of gas or if the gas in the propellant container 70 is extracted by suction. Such evacuation ensures that the film 80 will rest firmly on the propellant pellets 51 and the outside of the cap 60, thus ensuring that the propellant pellets 51 can no longer move freely within the propellant container 70. Secure positioning of the propellant pellets 51 furthermore ensures that the preignition charge 90 cannot slip and that the positioning thereof directly on the cap 60 and/or externally on the inner wall of the tube remains fixed.

FIG. 6 shows by way of example how a tube (generator tube) 20 of a gas generator can be connected to a supply tube 100. For example, the supply tube 100 can be a tube in which are accommodated thrust elements which, after ignition of the gas generator, are set in motion—driven by the gas of the gas generator—in order to set in motion a driving device of a vehicle safety device (e.g. a tightener drive for a belt or buckle pretensioner or the like).

FIG. 6 shows that the supply tube 100 is provided with a groove 110, which is prestamped and runs 360° around the supply tube 100.

The generator tube 20 is pushed onto the supply tube 100, with the result that the two tubes 20 and 100 overlap in one section. In the course of one or more pressing steps, wall material 25 of the generator tube 20 is pressed into the groove 110 to connect the two tubes 20 and 100. Such pressing in of the wall material 25 can be accomplished by means of one or more punches, for example. In the course of the pressing or punching, the wall material 25 is pressed into the groove 110 in a plurality of mutually separate circular arc segments, as shown by way of example by FIG. 7.

In FIG. 7, the connection between the supply tube 100 and the generator tube 20 is shown in a view from the side. Circular arc segments 120, in which the wall material 25 of the generator tube 20 has been pressed into the groove of the supply tube 100, can be seen. The circular arc segments 120 are separated from one another by segments 130 in which no wall material has been pressed in.

To produce a secure connection between the supply tube 100 and generator tube 20, wall material 25 of the generator tube 20 is preferably pressed into the groove 110 in six mutually spaced circular arc segments 120. The arrangement of the circular arc segments 120 on the circumference of the supply tube 100 is preferably rotationally symmetrical.

FIG. 8 shows a different embodiment of a connection between a supply tube 100 and a generator tube 20 of a gas generator. In the illustrative embodiment shown in FIG. 8, a 360° groove 110 has been prestamped into the supply tube 100, as is also the case in the illustrative embodiment shown in FIGS. 6 and 7. In contrast to the illustrative embodiment shown in FIGS. 6 and 7, the wall material 25 of the generator tube 20 in the illustrative embodiment shown in FIG. 8 has been pushed into the prestamped inner groove 110, forming an outer groove 200 which runs around through 360 degrees. The outer groove 200 surrounds the inner groove 110 concentrically.

The pushing in or pressing in of the wall material 25 of the generator tube 20 is preferably performed in the context of a roll-pressing process in order to ensure a uniform fastening over the entire circumference of the two tubes 20 and 100.

FIG. 9 shows another illustrative embodiment of a connection between a supply tube 100 and a generator tube 20 of a gas generator. In this illustrative embodiment, the supply tube 100 is widened in the region of the tube end 101 thereof, with the result that a widened supply tube section 102 is formed.

The generator tube 20 of the gas generator is pushed onto the widened supply tube section 102 and is pressed onto the end of the tube in such a way that an end section 23 of the generator tube 20 rests securely on the supply tube 100. The end section 23 lies between the widened supply tube section 102 and the tube end 22 of the generator tube 20.

The pressing on of the end section 23 on the supply tube 100 behind the widened supply tube section 102 can be performed in the context of a roll-pressing process, for example.

FIG. 10 shows another illustrative embodiment of a connection between a supply tube 100 and a generator tube 20 of a gas generator. In the illustrative embodiment shown in FIG. 10, two grooves which run around through 360° parallel to one another and into which wall material 25 of the generator tube 20 is pressed—e.g. by rolling or a roll-pressing step—are prestamped in the supply tube 100. In the course of the pressing in or rolling, two outer grooves 201 and 202, which run parallel to one another and concentrically with the inner prestamped grooves in the supply tube 100, are formed on the outside of the generator tube 20. The embodiment of the connection between the supply tube 100 and the generator tube 20 thus corresponds to the illustrative embodiment shown in FIG. 8, with the difference that two groove connections are present instead of just one single groove connection.

FIG. 11 shows an illustrative embodiment of a connection between a supply tube 100 and a generator tube 20 of a gas generator in which the generator tube 20 has been shrunk onto the supply tube 100. Shrinking on in this way can be accomplished, for example, by heating the generator tube 20, causing the inside diameter thereof to expand. The generator tube 20 thermally expanded in this way is then placed on the supply tube 100, with leaktight secure clamping between the two tubes resulting automatically from the contraction of the generator tube 20 as it cools.

FIG. 12 shows an illustrative embodiment of a connection between a supply tube 100 and a generator tube 20 of a gas generator, in which the two tubes are connected to one another by means of a bayonet joint 300. To form this bayonet joint 300, guide slots 305 are preferably formed on the inner wall of the generator tube 20, said slots being suitable for guiding pins, studs or stubs 310 or the like. The pins, studs or stubs 310 are preferably formed integrally on the supply tube 100.

To produce the bayonet joint 300, the pins, studs or stubs 310 are initially introduced into the guide slots 305 in an axial direction and are then locked in end sections 305a of the guide slot 305 by a rotary movement around the longitudinal axis of the two tubes.

FIGS. 13, 14 and 15 show another illustrative embodiment of a connection between a supply tube 100 and a generator tube 20 of a gas generator. In this illustrative embodiment, the generator tube 20 and the supply tube 100 are each provided with four holes 400 and 405 respectively. The holes 404 and 405 each form pairs of holes with oppositely situated holes aligned pairwise.

If the supply tube 100 is introduced into the generator tube 20, the holes 400 of the generator tube 20 can be moved into a position relative to the holes 405 of the supply tube 100 such that they are in alignment with one another. To connect the supply tube 100 to the generator tube 20, two studs 410 and 415 are then pushed through the holes 400 and 405, and the studs are then riveted at the ends on the outside 24 of the generator tube 20.

The arrangement of the two studs 410 and 415 is preferably chosen in such a way that they are at least approximately perpendicular to one another.

FIG. 15 shows the finished gas generator 10 with stud joint in a three-dimensional representation. The two studs 410 and 415, which are perpendicular to one another and bring about a connection between the generator tube 20 and the supply tube 100, can be seen. The propellant container 70 shown in FIG. 5, in which the propellant pellets 51 and the preignition charge 90 are welded within an evacuated film 18, are furthermore visible.

Moreover, FIG. 15 shows the fixing of the ignition device 30 on the first tube end 21 of the generator tube 20. The injection molded body 40, which holds the ignition device 30 in and on the first tube end 21, can be seen. It can also be seen that the electric connection elements 31 of the ignition device 30 are surrounded by a sleeve, which is formed by the outer section of the injection molded body 40.

In the case of the illustrative embodiments shown in FIGS. 1 to 15, it is regarded as advantageous if, for connection of the supply tube 100 to the generator tube 20, the tube end 101 of the supply tube 100 is thickened at the end in order to allow an increase in stability in the region of connection to the generator tube. The thickening of the tube end 101 of the supply tube can be accomplished by upsetting, for example. Such thickening of the supply tube 100 at the end by upsetting is illustrated in FIGS. 6, 8 and 9, for example.

Although the invention has been illustrated and described in greater detail by the preferred illustrative embodiments, the invention is not restricted by the examples disclosed, and other versions can be derived therefrom by a person skilled in the art without exceeding the scope of protection of the invention.

LIST OF REFERENCE SIGNS 10 gas generator
11 combustion chamber
20 tube
21 first tube end 22 second tube end
23 end section
24 outside
25 wall material
30 ignition device
31 connection element
40 injection molded body
41 inner section
42 middle section
43 outer section
50 propellant
51 propellant pellet
60 cap
61 tear-open seam
70 propellant container
80 film
90 preignition charge
100 supply tube
101 tube end
102 supply tube section
110 groove
120 circular arc segment
130 segment
200 groove
201 groove
202 groove
300 bayonet joint
305 guide slot
305a end section
310 pin, stud, stub
400 hole
405 hole
410 stud
415 stud

The invention claimed is:

1. A vehicle safety device having a gas generator, wherein the gas generator has a tube upon which an ignition device is fixed by means of a molded-in or molded-on injection molded body and wherein a supply tube is connected to the tube of the gas generator;
wherein the tube of the gas generator and the supply tube are connected together and wherein one of the tube and the supply tube is an inner tube and the other of the tube and supply tube is an outer tube and wherein the inner tube and the outer tube are connected together via a press fit; and wherein a portion of the wall of the outer tube, is pressed into at least one prestamped encircling groove of the inner tube;
wherein the portion of the wall of the outer tube is stamped into the prestamped encircling groove of the inner tube in at least three mutually separate circular arc segments.

2. The vehicle safety device as claimed in claim 1, wherein an end section of the inner tube is connected to the outer tube and has a greater wall thickness than an adjoining section of the inner tube located substantially midway along the length of the inner tube.

* * * * *